(No Model.)

A. C. HEATH & F. H. WHITE.
ROTARY CUTTER.

No. 403,667. Patented May 21, 1889.

UNITED STATES PATENT OFFICE.

AMASA C. HEATH AND FRED H. WHITE, OF SOUTH EASTON, MASSACHUSETTS.

ROTARY CUTTER.

SPECIFICATION forming part of Letters Patent No. 403,667, dated May 21, 1889.

Application filed January 31, 1889. Serial No. 298,182. (No model.)

*To all whom it may concern:*

Be it known that we, AMASA C. HEATH and FRED H. WHITE, of South Easton, in the county of Bristol and State of Massachusetts, have invented certain new and useful Improvements in Rotary Trimmers, of which the following is a specification.

This invention relates to rotary trimming devices for trimming articles made of wood pulp and other analogous material.

Wood pulp has been experimented with quite extensively as a material for the heels of boots and shoes; but the difficulty of trimming the material with knife-edged rotary cutters— such as are used in trimming leather heels— is so great that it has not been found practicable to use wood-pulp heels to any great extent, the material being of such toughness and density that it rapidly removes the cutting-edges of the knives of ordinary rotary cutter-heads, such as are used in trimming leather heels. After the knives become dull, they are liable to break fragments out of the heel, thereby destroying its value.

Our invention has for its object to provide a trimmer capable of practically trimming heels and other articles of wood pulp and other materials having similar characteristics as to density and toughness; and it consists in a series of blades having teeth or serrations $c$, instead of knife-edges, each tooth having converging sides, so as to be pointed, or nearly so, and acting to plow a channel in the pulp instead of removing shavings therefrom by a cutting action, combined with a rotary head or holder to which said blades are attached, said head having molded concave surfaces between the blades which support the heel and determine the depth of the furrows made in the heel by said teeth, and slots or passages at the front sides of the blades for the escape of the material detached by the blades $c$.

Figure 2:
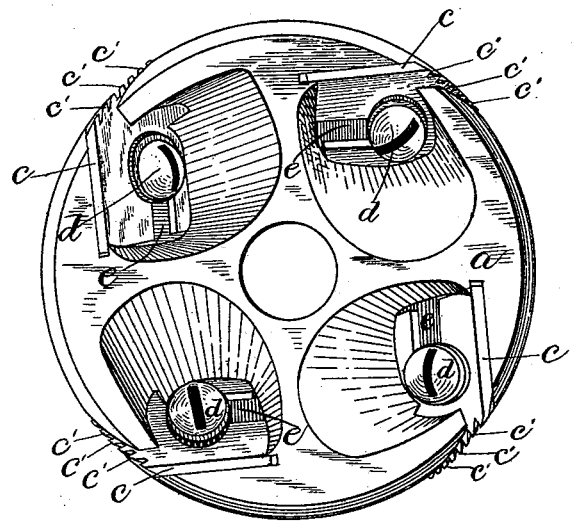
Figure 1:
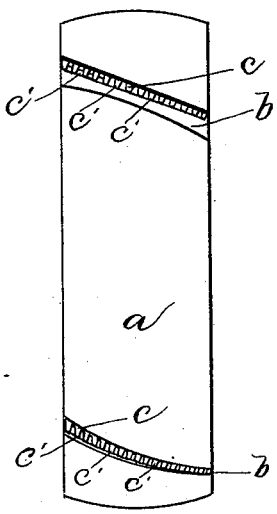
Figure 3:
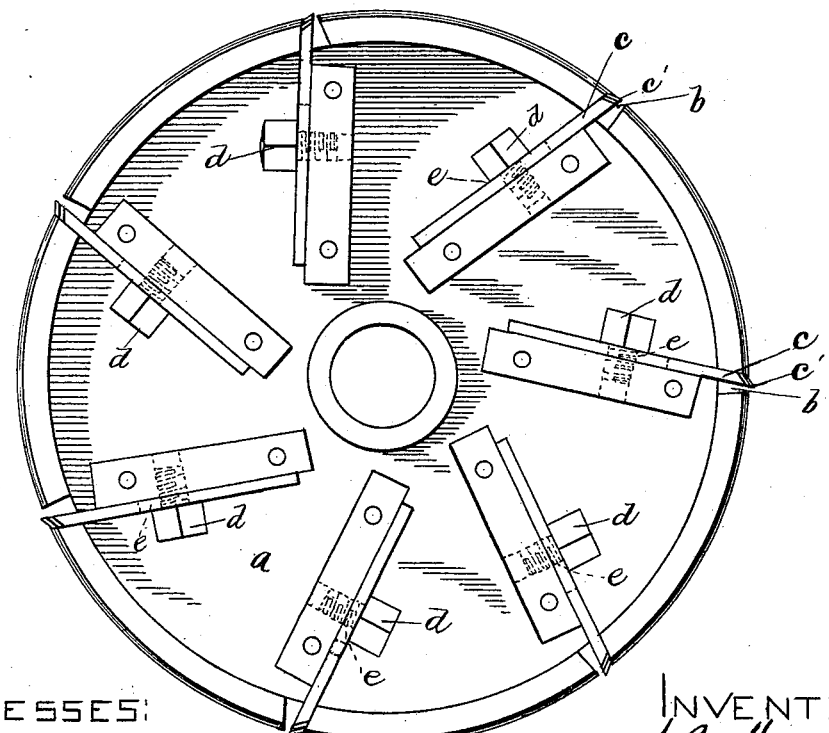

Of the accompanying drawings, forming a part of this specification, Figure 1 represents a front view of a cutter-head embodying our invention. Fig. 2 represents a side view of the same. Fig. 3 represents a side view of a cutter-head of somewhat different construction.

The same letters of reference indicate the same parts in all the figures.

In the drawings, $a$ represents a rotary head or holder having a circular periphery, in which are formed slots or openings $b$ for the passage of the particles detached by the teeth of the blades $c$. Said blades are attached to the head in any suitable way, and are arranged behind the slots, as shown. The acting portions of the knives are not continuous cutting-edges, but are divided by slots or notches into independent teeth or serrations $c'$, the sides of which converge to a point, or nearly so, said point being the penetrating or acting portion of the tooth, and being of such form that it plows a narrow groove or furrow in the surface of a heel.

By reference to Figs. 1 and 2 it will be seen that as the teeth are arranged in the rotary head the blades extend across the peripheral face of the said head. In this relation the sides of the teeth transversely of the said peripheral face of the head are what are referred to as being "converging," and in the claim appended to this specification the term "converging" as applied to the sides of the teeth will be understood to mean the sides between adjacent teeth in the rows of teeth extending across the face of the periphery of the rotary head. By forming the teeth in this way small or pointed cutting portions are formed, while the bases of the teeth are sufficiently large to give great strength to the teeth.

An important feature in the form of the teeth $c'$ is that they do not have knife-edges formed to shave or cut the material acted upon, their function being, as above stated, to plow rather than to cut like a knife. The absence of cutting or knife edges enables the blades to trim or reduce molded and compressed wood pulp without experiencing that rapid wear and deterioration which is inevitable when cutters having knife-edges are used on said material. The teeth in forming the grooves or furrows in the heel leave slight ridges on the surface thereof; but said ridges are so narrow that the very slightest lateral movement of the heel while it is being presented to the cutter will bring the ridges formed by any blade into position to be removed by the teeth of the succeeding blade. Said ridges can be easily removed after the trimming operation by a scouring-wheel or other tool, such as is usually employed to smooth the trimmed surface of a heel preparatory to burnishing the same.

We have found that teeth or serrations having the characteristics above set forth retain their operative shape, when used in cutting pressed and dried wood pulp, to such an extent as to make the operation of trimming articles of said material entirely practicable and free from the difficulties that have heretofore existed, as above recited.

We do not limit ourselves to any particular way of securing the blades to the cutter-head. In Fig. 1 we have shown the blades c and slots b arranged diagonally, so that the blades make a draw cut, the teeth c' being arranged substantially at right angles with the slots b, and therefore diagonal to the axis of rotation of the head. This arrangement is preferred by us because it gives the teeth a drawing action and enables them to avoid breaking the angle at the heel-seat or rand-edge of the heel. The blades should be adjustable, so that the depth of the furrows formed by the teeth may be regulated and wear of their acting points compensated for. We have shown the blades in Figs. 1 and 3 attached to the head by screws or bolts d, passing through slots e in the shanks of the blades; but it is obvious that the blades may be clamped between collars, or otherwise detachably held, after the manner of the knives of cutter-heads now in use for heel-trimming and other purposes. The blades may be adjusted at any desired angle.

If desired, the teeth c' may be made on independent shanks or bits, each constituting a section of a knife, said shanks or bits being stamped together side by side, so that the teeth sustain the same relation to each other as here shown.

The surfaces of the head a between the blades constitute rests for the heel, which control the penetration of the teeth into the heel and prevent excessive reduction or removal of the surface of the heel.

We claim—

In a rotary trimmer, the combination, with a rotary head or holder provided with a rounded or molded peripheral face, of a series of blades extending across said face and having teeth the sides of which, between the teeth of the series, are converging to form small or pointed cutting portions, and the said head in front of the said blades having escape-openings for the cuttings, substantially as set forth.

In testimony whereof we have signed our names to this specification, in the presence of two subscribing witnesses, this 28th day of January, A. D. 1889.

AMASA C. HEATH.
FRED H. WHITE.

Witnesses:
JOHN O. DEAN,
C. F. BROWN.